United States Patent

Smith et al.

[15] 3,696,320

[45] Oct. 3, 1972

[54] TELEPHONE PATCH SYSTEM

[72] Inventors: Donald J. Smith, Woodland Hills, Calif.; Seth Foster, Bellview, Wash.

[73] Assignee: Smith-Schreyer & Assoc., Inc.

[22] Filed: Sept. 24, 1970

[21] Appl. No.: 75,445

[52] U.S. Cl. .........339/18 B, 339/186 M, 339/192 R, 339/195 M, 339/252 P

[51] Int. Cl. .........................H01r 13/64, H01r 23/02

[58] Field of Search..........339/18, 28, 29, 31, 32, 33, 339/65, 66, 108 TP, 156 R, 157 R, 191 M, 192, 195 M, 196 M, 198 P, 198 S, 222, 252 P, 242, 19, 186 R, 186 M; 179/1 PC, 98, 175

[56] References Cited

UNITED STATES PATENTS

| | | | |
|---|---|---|---|
| 3,004,235 | 10/1961 | Cohen | 339/18 B |
| 2,207,477 | 7/1940 | Blackmon | 339/66 R |
| 1,794,359 | 3/1931 | Bockius et al. | 339/196 M |
| 3,238,497 | 3/1966 | Zell et al. | 339/252 P |
| 625,828 | 5/1899 | Case | 339/192 R |
| 1,631,178 | 6/1927 | Wordack | 324/51 |
| 1,833,158 | 11/1931 | Frank | 324/51 |

FOREIGN PATENTS OR APPLICATIONS

| | | | |
|---|---|---|---|
| 1,382,630 | 11/1964 | France | 339/19 |

*Primary Examiner*—Marvin A. Champion
*Assistant Examiner*—Lawrence J. Staab
*Attorney*—Lyon & Lyon

[57] ABSTRACT

A telephone patch system includes an insulating terminal block having a plurality of passageways and guideways arranged together in a series of columns. Each passageway includes a contact pin which is connected at one end to a telephone line. Each column is adapted to receive a patching plug and a monitoring plug. The patching plug includes a plurality of contact members and a guide member. Each contact member is adapted to extend into a passageway and make electrical contact with the unconnected end of a contact pin. The guide member is adapted to cooperate with a guideway to orient the patching plug.

19 Claims, 8 Drawing Figures

INVENTORS.
DONALD J. SMITH
SETH FOSTER

Lyon & Lyon
ATTORNEYS

TELEPHONE PATCH SYSTEM

BACKGROUND OF THE INVENTION

Telephone patching systems are commonly used in telephone systems to connect desired ones of a first series of telephone lines with desired ones of a second series of telephone lines. Such systems are found, for example, in telephone exchanges, central offices and large office or apartment buildings where a given number of outside telephone lines come into the office and are connected with inside telephone lines. Since it is also necessary at times to change these outside line-inside line connections, patching systems are conventionally temporary in nature, that is, not soldered or otherwise permanently installed, and are preferably easy to connect and disconnect. In a central telephone office, for example, in the conventional patching system used heretofore there is provided a main frame which is basically a large slab of insulating material supported by a suitable framework. A plurality of terminal pins extend through the insulating slab. The outside lines coming into the central office are connected to selective ones of these terminal pins on one side of the slab, quite often in a permanent fashion. A second slab of insulating material also having terminal pins extending there-through serves the same purpose for the inside lines, that is, the inside lines are connected to selective terminal pins on one side of the second slab. To connect an inside line with an outside line, it is only necessary to make a connection between the unconnected ends of the terminal pins extending through the respective slabs. This is done by means of patch cords which are nothing more than wires of various lengths having exposed wire conductors at each end. A conventional tool is used to wrap the wire conductors around the terminal pins of these respective insulating slabs. When it is desired to change a connection, the patch cords are stripped off the terminal pins and a new patch cord used to make the new connection.

Such systems have numerous disadvantages. Perhaps the foremost disadvantage is the great amount of floor space required for the use of such a system. Since all of the connections are made to exposed terminal pins, these pins must be spaced apart a sufficient distance to insure that leakage paths between them as a result of moisture, etc., are sufficiently long so as to substantially eliminate the possibility of a cross talk. Also, a great wastage of the patch cords occurs because the distances between the various terminals that are to be connected are so diverse, it has been found to be quicker to use a new patch cord for each installation and discard the old patch cord rather than try to reuse the original patch cord.

SUMMARY OF THE INVENTION

According to the present invention, a telephone patching system is provided which can handle the same number of lines as are handled by a conventional system but in a much smaller space. In addition, a change in a connection can be made much more quickly and easily than as heretofore been possible.

These advantages are achieved by the use of one or more insulating terminal blocks, each of which includes terminal or contact pins positioned within passageways in the block. One end of each pin is permanently connectable to an outside (or inside) telephone line and the other end of the pin is adapted to cooperate with a patching plug. The block also includes guideways and the passageways and guideways are arranged in columns, with each column adapted to receive a patching plug. The contact members on each patching plug can be easily inserted or removed from the passageways and a guide member on the patching plug is adapted to cooperate with a guideway in the column so that proper connections will be made and polarity reversals will be prevented. Each column is also adapted to receive a monitoring plug that can also be easily inserted and removed to permit the lines to be monitored before a connection change is made. While the contact pins in each block are generally spaced quite closely together, the effective leakage pad will be quite long because each of the contact pins is recessed in a passageway in the insulating terminal block.

It is, therefore, an object of the present invention to provide a compact, reliable and easy to operate patching system for telephone systems or the like.

DESCRIPTION OF THE INVENTION

Figures 1, 2:
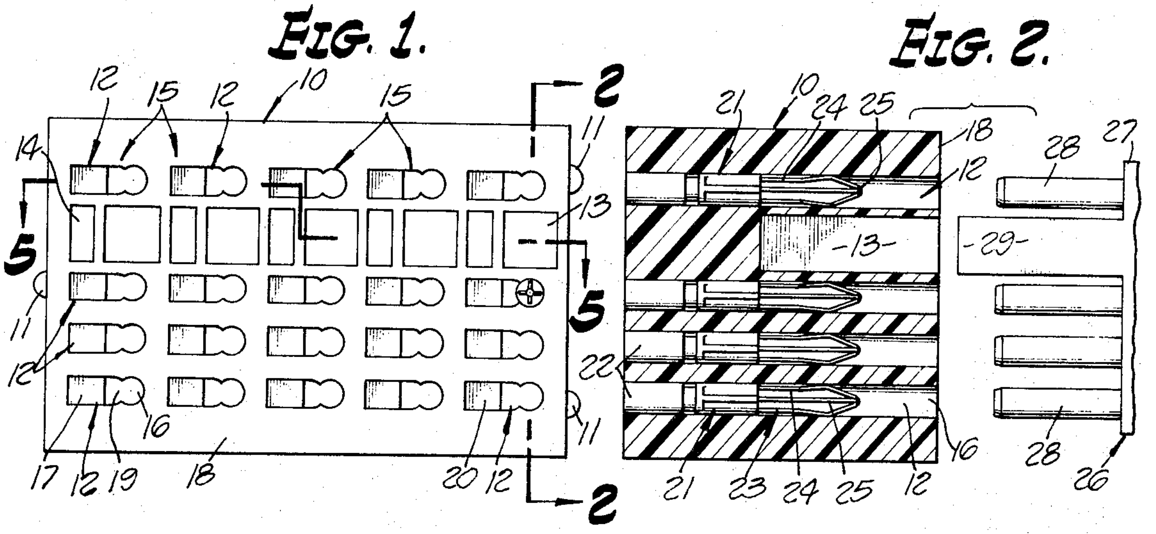
FIG. 1 is a front elevation view of the insulating terminal block of the present invention.
FIG. 2 is a cross-sectional view taken along lines 2—2 of FIG. 1 and shows the cooperation of the insulating terminal block and the patching plug.

In the drawings, only a single terminal block is illustrated. It should be understood, however, that in an actual installation a number of these blocks would be supported on a framework and used in concert, the number of blocks being determined by the number of lines to be handled. For example, a hundred line module would be made up of twenty of these blocks arranged in suitable rows and columns and supported by a framework. Preferably, such blocks would be slidingly received in such a framework so that they could be replaced if necessary. Alternatively, the terminal blocks could, of course, be provided with additional columns of openings.

As illustrated in the drawings the terminal block, generally designated 10, is constructed of an insulating material, such as nylon, and is in the form of a rectangular block. Flange members 11 are provided on the sides of the terminal block 10 to provide a locking arrangement when additional blocks are used in concert. The terminal block 10 includes a plurality of passageways 12, patch plug guideways 13, and monitor plug guideways 14, all of which are arranged together in a series of columns, designated generally by the numeral 15.

Each passageway 12 includes two adjacent passages 16 and 17, both of which are open at the front side 18 of the block 10, with a continuous slot opening 19 between the two passages. Passage 16 is uniform and generally circular in cross-section. Passage 17 is generally rectangular in cross-section, but includes a sidewall 20 which is angularly disposed toward the passage 16 to cause the passage 17 to taper in cross-section. The patch plug guideways 13 and the monitor plug guideways 14 are also open at the front side 18. The monitor plug guideway 14 is generally smaller in cross-section then the guideway 13, but both guideways 13 and 14 are rectangular and uniform in cross-section.

Mounted within each passageway 12 is a contact or terminal pin 21, one end 22 of which is permanently connectable to a telephone line (not shown) with the other end 23 comprising a plurality of flexible metal conductors 24 joined together at the end to form the male portion 25 of an electrical connection. The male connector 25 is recessed within the passage 16 and the end of the male connector 25 is located a substantial distance from the front side 18 of the insulating terminal block 10. Thus, the open path between adjacent male connectors in the same column 15 and adjacent columns 15 is a substantial distance.

As seen best in FIG. 1, each column 15 includes a patch plug guideway 13 and monitor plug guideway 14, positioned adjacent each other. The patch plug guideway 13 is in alignment with the passages 16 and the monitor plug guideway is in alignment with the passages 17 for reasons discussed below. Each column 15 also includes four passageways 12, each with a contact or terminal pin 21. This four pin arrangement is common in a central office system even though only two are actually required. It should be noted however, that the number contact pins 21 in a column 15 along with the total number of contact pins in the terminal block 10 can easily be varied to meet a particular demand.

Figures 3, 4:
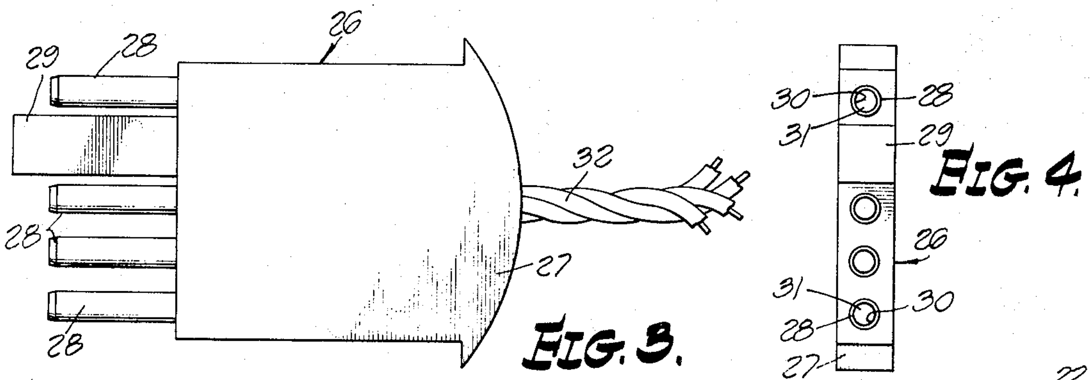
FIG. 3 is a side elevation of the patching plug.
FIG. 4 is an end view of the patching plug.
Figures 5, 7, 8:
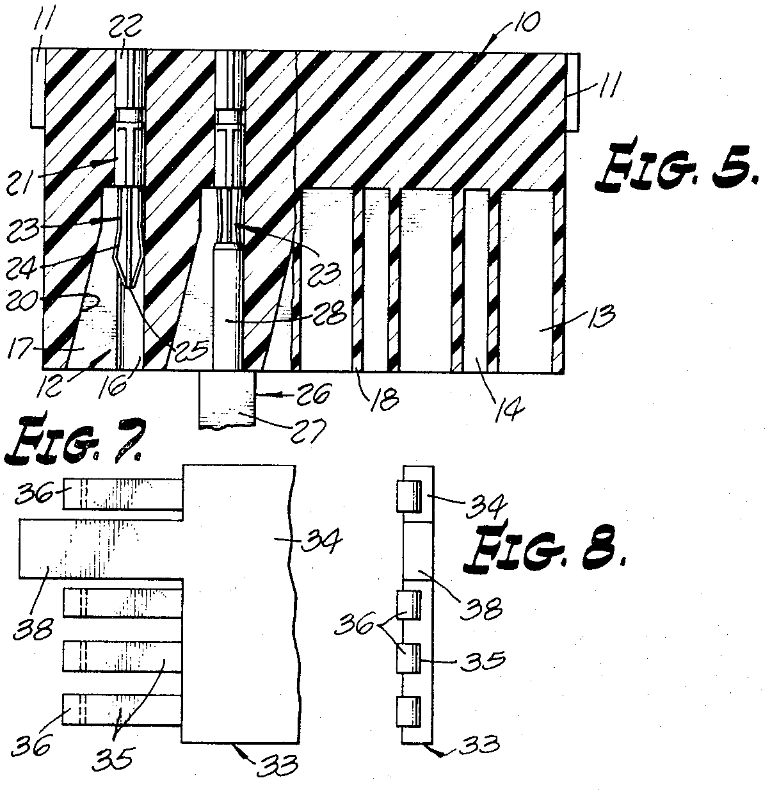
FIG. 5 is a cross-sectional view taken along lines 5—5 of FIG. 1.
FIG. 7 is a side elevation of a monitoring plug.
FIG. 8 is an end view of the monitoring plug.
Figure 6:
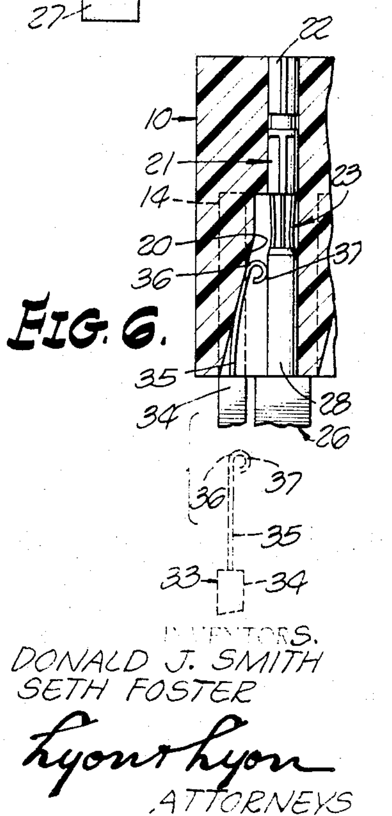
FIG. 6 is a fragmentary cross-sectional view of the insulating terminal block of FIG. 1 illustrating the use of a monitoring plug.

The passages 16 and the patch plug guideway 13 in each column 15 are adapted to receive a patch plug, generally designated 26. The patch plug 26, as seen in FIGS. 2, 3 and 4 includes an insulating body 27 formed of an insulating material, such as nylon. The patch plug 26 also includes a plurality of contact members 28 and a guide member 29 all of which extend from the body 27. Each contact member 28 is formed of an electrically conductive material, such as copper, and is tubular in shape with a circular cross-section which corresponds with the cross-section of the passage 16 to provide a snug fit when the contact member 28 is inserted into the passage 16. Each contact member 28 includes an open end 30 which forms the female portion 31 of an electrical connection and the opening 30 is adapted to receive the male portion 25 of a contact pin 21 when the contact member 28 is inserted into the passage 16 to complete the electrical connection, as shown in FIGS. 5 and 6. A series of conductor wires 32 secured within the body 27 to the contact members 28 electrically connect the contact members 28 to corresponding contact members of another patch plug. The guide member 29 of the patch plug 26 is rectangular in shape and the cross-section of the guide member 29 corresponds to the cross-section of the guideway 13 to also provide a snug fit when the guide member 29 is inserted into the guideway 13. The patch plug 26 is provided with a single guide member 29 and as many contact members 28 as there are contact pins 21 in each column which, in this embodiment is four.

The monitor plug guideway 14 and the passages 17 of each column 15 are adapted to receive a monitoring plug 33. The monitoring plug 33, as best seen in FIGS. 6, 7 and 8, also includes an insulating body 34 with a plurality of contact arms 35 extending from the body 30. Each contact arm 35 comprises generally a flexible prong of a conductive material which are bent at the end to provide a cam follower 36 and a contact point 37. The contact arm 35 is adapted to be inserted through the open end of the passage 17 with the cam follower 36 of the arm 35 engaging the angled sidewall 20 of the passage 17. As the contact arm 35 is pushed farther into the passage 17, the angled sidewall 20 causes the end of the arm 35 to move toward the passage 16 until the contact point 37 moves through the slot opening 19 where it will engage a contact member 28 of an adjacent patch plug 26 inserted into the same column 15, as shown in FIG. 6. The monitoring plug 33 also includes a guide member 38 which is rectangular in shape and which has a cross-section corresponding to the cross-section of the guideway 14, so as to provide a snug fit when the guide member 38 is inserted into the guideway 14. The monitoring plug 33 includes a single guide member 38 and four contact arms which correspond to the number of passageways 12 in each column 15 of the terminal block 10. The contact arms 35 of the monitoring plug 33 are electrically connected to an instrument (not shown) which permits a workman to monitor the lines.

In operation of the telephone patch system of this invention, it is generally understood that the inside telephone lines are connected to the contact or terminal pins 21 a group of one or more terminal blocks 10 and the outside telephone lines are connected to the terminal pins 21 of another nearby group of one or more terminal blocks 10. Normally several patch units are employed, each of which comprises two patch plugs 26 of the type previously described connected by a series of wires 32 of sufficient length to reach from the one group of terminal blocks 10 to the other group of terminal blocks 10. When a connection between the inside telephone lines and the outside telephone lines is required, a patch plug 26 of a patch unit is inserted into the appropriate column 15 of a terminal block 10 connected to the inside telephone lines and the other patch plug 26 of the patch unit is inserted into the corresponding appropriate column 15 of a terminal block 10 connected to the outside lines.

When a connection change is desired, a monitoring plug 33 is first inserted into the passageways 12 of column 15 where the change is to take place to determine whether the lines are in use. Once it has been determined that the lines are not in use, the patch plug 26 adjacent the monitoring plug 33 is removed and another patch plug 26 of another patch unit is inserted to accomplish the connection change.

This invention provides a reliable telephone patch system which requires a relatively small amount of space, because of the compactness of the equipment employed within the system. However, cross-talk which might normally be associated with such compact equipment is avoided. Connections and connection changes between the inside and outside telephone lines and monitoring of the lines can be accomplished quickly and easily. Moreover, even though the outside-inside line connections are of a temporary nature, the equipment used to make the connections can be reused indefinitely.

Having fully described my invention, it is to be understood that I do not wish to be limited to the details herein set forth, but my invention is of the full scope of the appended claims.

I claim:

1. In a telephone patch system, an electrical connector, comprising: an insulating terminal block having a plurality of contact pins imbedded therein, one end of each said pin adapted to be connected to a telephone line; a plurality of passageways in said terminal block, each said passageway having an opening and extending from said opening to one of said contact pins, a patch plug having a plurality of contact members, each said contact member adapted to be inserted into one of said passageways through said opening and engage the other end of said contact pins to provide an electrical connection between said contact member and said contact pin, and a monitoring plug having a plurality of contact arms, each said contact arm adapted to be inserted into one of said passageways adjacent one of said contact members and make electrical contact therewith.

2. The device of claim 1, wherein said terminal block is provided with at least one patch plug guideway and at least one monitoring plug guideway, said patch plug having a guide member adapted to be inserted into said patch plug guideway to orient said patch plug with respect to said terminal block, and said monitoring plug having a guide member adapted to be inserted into said monitoring plug guideway to orient said monitoring plug with respect to said terminal block.

3. The device of claim 2, wherein each said patch plug guideway is positioned adjacent one of said monitor plug guideways and each said pair of adjacent guideways are in alignment with a series of said passageways, each said series of passageways and each said aligned guideways being arranged in a column, and each said column adapted to cooperate with said patch plug and said monitoring plug.

4. In a telephone patch system, an electrical connector, comprising:

an insulating terminal block having a plurality of contact pins recessed within said terminal block, one end of each said pin adapted to be connected to a telephone line;

a plurality of passageways in said terminal block, each said passageway having an open end and including first and second passages extending from said open end into said block;

each said contact pin having said other end positioned within one of said first passages;

a patch plug having a plurality of contact members, each said contact member adapted to be inserted into one of said first passages to engage said other end of one of said contact pins to provide an electrical connection between said contact member and said contact pin; and a monitoring plug having a plurality of contact arms, each said contact arm adapted to be inserted into one of said second passages to make electrical contact with said contact member in said second passage.

5. The device of claim 4, wherein said terminal block includes a patch plug guideway and a monitor plug guideway, said patch plug having a guide member adapted to be inserted into said patch plug guideway to orient said patch plug with respect to said block, and said monitor plug includes a guide member adapted to be inserted into said monitoring plug guideway to orient said patch plug with respect to said block.

6. The device of claim 5, wherein said patch plug guideway is in alignment with said first passages and said monitor plug guideway is in alignment with said second passages; said guideways being adjacent to each other and said guideways and said passageways arranged in a column, said column adapted to cooperate with said patch plug and said monitoring plug.

7. The device of claim 6, wherein a plurality of adjacent guideways are provided, each said adjacent guideways and said passageways arranged in a series of columns.

8. The device of claim 7, wherein the number of passageways within each column is four.

9. The device of claim 7, wherein said patch plug includes a number of contact members equal to the number of passageways in each column, and said contact members and said guide member are so positioned on said patch plug to cooperate with said patch plug guideway and said passageways within a said column.

10. The device of claim 7, wherein said monitoring plug includes a number of contact arms equal to the number of passageways in each column, and said contact arms and said guide member are so positioned on said monitoring plug to cooperate with said monitoring plug guideway and said passageways within a said column.

11. The device of claim 4, wherein each said first passage is uniform and generally circular in cross-section and each said second passage tapers and is generally rectangular in cross-section, each said contact member being tubular in shape and having a cross-section corresponding to said first passage, and each said contact arm comprising a flexible member adapted to engage a sidewall of said second passage and curve into said first passage against said contact member in said first passage.

12. A telephone patch system, comprising: at least one first insulated terminal block having a plurality of terminal pins embedded therein with one end of each said pin connected to an outside telephone line; at least one second insulated terminal block having a plurality of terminal pins embedded therein with one end of each said pin connected to an inside telephone line; a plurality of passageways in each said terminal block extending inwardly therein from openings in said terminal block with said other ends of said pins positioned within said passageways and spaced inwardly from said openings to avoid cross-talk between adjacent pins; a plurality of guideways in each said terminal block extending inwardly therein from opening in said terminal block, each said guideway associated with a series of said passageways, each said series of passageways and said associated guideway generally arranged in a column; at least one patch unit having a series of wires and a pair of patch plugs, each said patch plug having a plurality of contact members equal to the number of said passageways within each said column and a guide member with the positions of said contact members and said guide members on each said plug corresponding to the positions of said passageways and said guideway in each said column whereby one of said plugs is adapted to be received by one of said columns in said first terminal block with said contact members engaging said terminal pins therein and said other plug is adapted to be received by one of said columns in said second terminal block with said contact members engaging said terminal pins therein to provide an electrical connection between some of said outside telephone lines and some of said inside telephone lines.

13. The telephone patch system of claim 12, wherein each said column includes four passageways and each said plug includes four contact members.

14. The telephone patch system of claim 13, wherein said guideway in each said column is located nearer one end of said column to properly orient said contact members of said plug with respect to said terminal pins in said column.

15. The telephone patch system of claim 12, wherein a plurality of first insulated terminal blocks are removably arranged together to provide a terminal board for outside telephone lines and a plurality of second insulated terminal blocks are removably arranged together to provide a terminal board for inside telephone lines.

16. The telephone patch system of claim 12 wherein a monitoring plug is provided having a plurality of contact arms, each said contact arm adapted to be inserted into one of said passageways adjacent one of said contact members and make electrical contact therewith.

17. A terminal block for a telephone patch system, comprising: an insulated housing having a plurality of terminal pins embedded therein with one end of each said pin adapted to be connected to a telephone line; a plurality of passageways in said housing extending inwardly therein from openings in said housing, each said passageway including adjacent first and second passages with said other ends of said pins at the ends of said first passages spaced inwardly from said openings and thereby separated by sufficient insulation to avoid cross-talk, each said second passage being angularly disposed inwardly toward said adjacent first passage; and an opening between each said first and second adjacent passages for communication therebetween.

18. The terminal block of claim 17, wherein said first passage is substantially uniform and circular in cross-section and said second passage tapers and is substantially rectangular in cross-section.

19. The terminal block of claim 17, wherein said passageways are arranged in a plurality of columns, said housing including a plurality of first and second guideways, said first guideways being associated with said first passages and said second guideways being associated with said second passages with each said column including at least one said first guideway and one said second guideway.

* * * * *